(12) United States Patent
Smith et al.

(10) Patent No.: US 9,829,105 B2
(45) Date of Patent: Nov. 28, 2017

(54) NITRIDE COATED PISTON RING

(71) Applicant: MAHLE International GmbH, Stuttgart (DE)

(72) Inventors: Thomas Smith, Muskegon, MI (US); Jason Bieneman, Ann Arbor, MI (US)

(73) Assignee: MAHLE INTERNATIONAL GMBH, Stuttgart (DE)

(*) Notice: Subject to any disclaimer, the term of this patent is extended or adjusted under 35 U.S.C. 154(b) by 0 days.

(21) Appl. No.: 14/490,746

(22) Filed: Jun. 15, 2015

(65) Prior Publication Data

US 2016/0363222 A1 Dec. 15, 2016

(51) Int. Cl.
F16J 9/26 (2006.01)
B23P 15/06 (2006.01)
C23C 8/04 (2006.01)
C23C 8/26 (2006.01)

(52) U.S. Cl.
CPC ............ F16J 9/26 (2013.01); B23P 15/06 (2013.01); C23C 8/04 (2013.01); C23C 8/26 (2013.01); Y10T 29/49281 (2015.01)

(58) Field of Classification Search
CPC ......... B23P 15/06; B23P 15/065; B23P 15/08; Y10T 29/49274; Y10T 29/49281; Y10T 29/49282; F16J 9/20–9/206; C23C 8/04; C23C 8/26
USPC ................................................ 277/442, 443
See application file for complete search history.

(56) References Cited

U.S. PATENT DOCUMENTS

| 4,256,318 | A | * | 3/1981 | Bush | F16J 9/14 277/435 |
| 6,508,473 | B1 | * | 1/2003 | Tanaka | C23C 14/0641 277/440 |
| 6,562,480 | B1 | * | 5/2003 | Stong | C23C 4/06 29/888.074 |
| 2002/0117808 | A1 | * | 8/2002 | Ogawa | C23C 8/26 277/443 |
| 2004/0037969 | A1 | * | 2/2004 | Smith | C23C 4/06 427/446 |
| 2005/0067790 | A1 | * | 3/2005 | Smith | C23C 4/00 277/434 |
| 2009/0174150 | A1 | * | 7/2009 | Smith | F16J 9/206 277/442 |
| 2014/0197602 | A1 | * | 7/2014 | Lahrman | F16J 9/20 277/443 |
| 2015/0091255 | A1 | * | 4/2015 | Issler | F16J 9/14 277/442 |
| 2016/0178054 | A1 | * | 6/2016 | Tsuji | F02F 5/00 277/442 |

* cited by examiner

Primary Examiner — Christopher Besler
Assistant Examiner — Matthew P Travers
(74) Attorney, Agent, or Firm — Reising Ethington P.C.

(57) ABSTRACT

A piston ring and a method of forming a piston ring. A masking agent is applied to a selective area on an exterior surface of a piston ring. The masking agent inhibits the subsequent application of additional coatings to the selective area on the exterior surface of the piston ring. In one form, the masking agent may inhibit the subsequent application of a nitride layer to the selective area on the exterior surface of the piston ring. A recess may be formed in an outer peripheral side of the piston ring, and a thermal spray coating may be formed within the recess in the outer peripheral side of the piston ring.

8 Claims, 4 Drawing Sheets

NITRIDE COATED PISTON RING

INTRODUCTION

Internal combustion engines use piston rings to provide a necessary seal between the piston and cylinder wall. The piston rings are designed to seal in the gases produced above the piston during the combustion process. The more intimate the contact between the piston ring and cylinder wall, the more effective this seal will be. The more effective the seal, the more power produced by the engine. Ideally, the entire outer piston ring surface should tightly and completely contact the cylinder wall. The contact of the ring against the cylinder wall produces a constant frictional force on the ring and cylinder wall during normal engine operation. The frictional force causes the outer surface edge of the piston ring to wear. Piston rings used in an internal combustion engine comprise a base metal formed into a ring. The base metal has a low resistance to frictional wear. To reduce the wear on the ring, plating and coating operations are performed on the ring. For example, a nitride coating may be formed on a piston ring to provide a harder and more durable wear resistant surface than the base metal of the ring.

SUMMARY OF THE PRESENT DISCLOSURE

The present disclosure describes a piston ring designed for use in an internal combustion engine or compressor application. The piston ring can be formed from an iron base material, e.g. cast iron or stainless steel, although any metal or other suitable material can be used.

The outer surfaces of the piston ring can be first subjected to a masking process. The masking material or agent can be any plated pure metal, i.e. copper, tin, nickel. The masking material can also be a ceramic-metal composite, pure ceramic or a masking paint.

The masking agents can be applied to the surface of the piston ring using a best known method for the application of each specific masking agent. This disclosure describes depositing a plated nickel metal masking agent, but many other plated metals can be used to achieve the same result.

The metallic masking agent can be applied in a two-step electro-chemical deposition process. The first layer of nickel plating is formed by an electrolytic deposition process. The second layer of nickel plating is formed by an electro-less deposition process.

The electrolytic nickel plating in this disclosure has a thickness of about one micron. The electro-less nickel plating in this disclosure has a thickness of about three microns.

The masking agent; regardless of composition, are designed to, and ideally inhibit the formation of additional coatings that are subsequently applied to selected surfaces of the piston ring.

Following the plating process; the metal plating can be removed from selected areas of the piston ring surface before subsequent coating operations are performed. The plating can be removed from selected areas of the piston ring by any mechanical, chemical or any other suitable removal operations. Removing the plating from the piston ring surface should expose the bare metal of the ring.

The coating processes are designed to form wear and corrosion resistant layers on the exposed metal surfaces of the piston ring. Ideally, all subsequent coating formation is prevented on the areas of the piston ring masked with the plating.

A diffused nitride coating applied to the piston ring. Ideally, the nitride coating is formed on the surfaces without the masking agent. The nitride coating is formed on selected areas of the bare surface of the piston ring using predetermined nitride diffusion parameters.

The diffusion parameters of the nitride coating process can be those known to form a nitride layer with optimum wear and adhesion characteristics. The diffusion parameters will vary depending on the service requirements of the diffused nitride coating.

A nitride layer is formed on most of the lateral top side, and most of the lateral lower side. In some embodiments specified of this disclosure, the nitride layer is absent from the inner peripheral diameter of the piston ring.

In all embodiments of this disclose, the nitride layer is absent on all surfaces, and sub-surfaces of the outer peripheral diameter of the piston ring.

A HVOF coating is applied to selected areas of the piston ring after the masking agent is removed from selected areas on the outer peripheral diameter the piston ring.

The HVOF coating is formed on the exposed base metal of the piston ring using predetermined HVOF deposition parameters. The deposition parameters will vary depending on the service requirements of the HVOF coating. Most of the outer peripheral side of the piston ring is usually coated with the HVOF coating.

To contribute to the wear resistant properties of the piston ring, the upper and lower outer areas of the outer peripheral surface of the piston ring can be coated with chromium plating, a chromium-ceramic coating, or a HVOF coating.

A sharp corner can be formed on the piston ring where the upper and lower lateral sides terminate into the peripheral outer diameter. One embodiment of this sharp corner is to aid in oil consumption control in the engine.

DESCRIPTION

Piston rings used in internal combustion engines are subjected to significant frictional forces during normal engine operation. The metal and metal alloys (usually steel) most commonly used in the production of piston rings have a very low resistance to frictional wear. Frictional wear is a major cause of piston ring failure, and power loss in internal combustion engines.

During normal engine operation, the piston ring upper and lower lateral sides are subjected to severe frictional forces. As the piston oscillates within the cylinder, the piston ring lateral sides impact against the piston ring groove. The constant contact and motion of the lateral sides within the piston ring groove wall wears down the lateral sides of the piston ring.

Properly fitted piston rings have a minimum clearance between the piston ring groove and the piston ring. As the piston ring lateral side material wears the gap between the piston ring outer diameter and the piston ring groove enlarges. The enlarged gap can increase the rate of wear of the piston ring wear may result in a loss of engine efficiency and power.

One measure of engine performance is based on retaining the maximum amount of combustion gases within the combustion chamber during a portion of the combustion cycle. An enlarged gap may allow a volume of combustion gas to "blow-by" the piston. The engine loses efficiency and power as the amount of "blow-by" increases.

"Blow-by" reduces the volume of combustion gas available to exert pressure on the piston may result in a loss of engine power. As the piston ring wears, the wear rate of the ring and groove is accelerated. To reduce or eliminate the "blow by" and wear phenomenon, the piston ring lateral side incorporates the design provided in this disclosure. This design incorporates the piston ring lateral side composed of wear resistant surfaces.

Nitride coatings are very hard and especially resistant to frictional and abrasive wear. Nitride coatings are used in piston ring applications to combat the wear incurred on the piston ring lateral sides.

The exceptional hardness of the nitride layer has a mechanical limitation with regards to cracking. Because of its high hardness, the nitride layer is brittle. Brittle materials are usually very susceptible to crack formation and crack propagation through the material.

It is well known in the art nitride material is especially susceptible to cracking when used as a coating on piston rings. Nitride cracking is most prevalent at sharp corners or where stress is concentrated on the piston ring. The upper and lower corners where the lateral sides of the piston ring meet the outer diameter of the piston ring are areas of high stress concentrations.

In the present art, brittle nitride material is applied over a cast iron alloy piston ring. In most applications, Cast iron alloys are significantly less brittle that nitride coatings. A less brittle material overlaid by a more brittle material has an increase propensity to crack when all other factors remain constant.

When a crack propagates through a material, the crack energy sometimes is sufficient to breach an interface between the brittle material and a less brittle material it is in contact with. In these instances, the crack may then continue its path from the more brittle material into and sometimes through the less brittle adjacent material. This crack propagation scenario is well known in automotive piston ring engineering.

As cracks form and propagate through the nitride coating and iron alloy piston ring, some of the cracked material begins to flake away from the substrate. The flakes of nitride and cast iron alloy can cause minimal or catastrophic damage, depending on the service conditions and the severity of the cracking.

The present disclosure provides eliminating the crack propagation through a brittle nitride material coating a piston ring and into a less brittle cast iron material used for the piston ring body. The elimination of the cracking phenomenon prolongs engine service life and reduces the cost of maintenance and repairs to the engine.

The cracking of the nitride coating is eliminated because the corners of the piston ring where the lateral sides meet the outer peripheral diameter are not coated with nitride.

This disclosure outlines an improved piston ring is detailed. The piston ring body is composed of a metal based alloy, usually iron based alloys. The piston body is defined with an outer peripheral face and an annular shape. The piston ring is provided with wear resistant coatings on localized areas on the piston ring.

To prevent coatings being deposited where they are not desired, a mask made of plated metal is deposited to the surface of the piston ring. The ring surface should be thoroughly cleaned using a best known cleaning method standard in the industry.

To obtain optimum plating results; the ring surface should be free of all foreign materials. The amount or level contamination present on the piston ring is inversely proportional to the adhesive bond of the plating metal to the piston ring surface. The first layer of nickel is deposited on the piston ring surface base metal using a standard electrolytic plating method.

BRIEF DESCRIPTION OF THE DRAWINGS

Referring now to the drawings, illustrative examples are shown in detail. The drawings represent the exemplary illustrations described in this application. The drawings are not to scale. Certain features may be exaggerated to better illustrate, and explain an innovative aspect of an exemplary illustration. The exemplary illustrations presented in this application are not intended to be exhaustive, limiting or restricting to the precise form and configuration shown in the drawings. Exemplary illustrations of the present invention are described in detail by referring to the drawings as follows.

DETAILED DESCRIPTION

The discussion that follows and also to the drawings, illustrative embodiments are shown in detail. Certain features may be exaggerated, removed, or partially sectioned to better illustrate and explain the present disclosure. The descriptions set forth in this application are not intended to be exhaustive limit or restrict the claims in any way to the precise form.

The present disclosure provides using a plated nickel metal 210 to inhibit the formation of coatings 350, 360 on the surface of the piston ring. This disclosure suggests the use of a two-layer, nickel metal masking and plating layer 210 applied to the piston ring.

Figure 1:
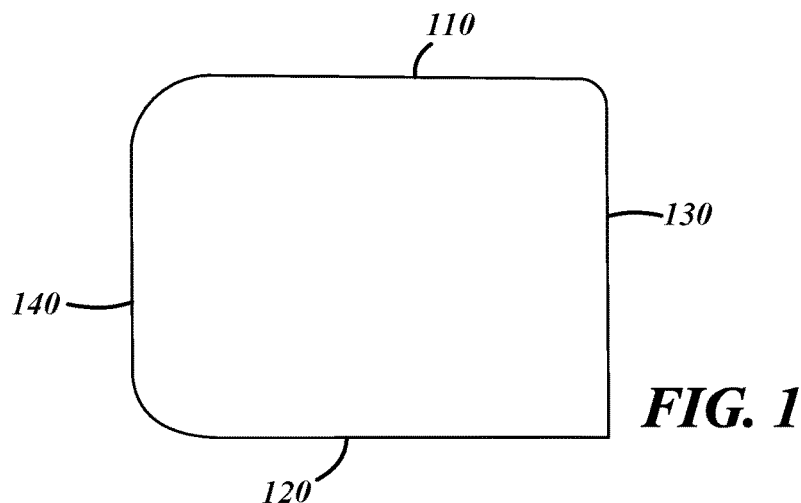
FIG. 1 illustrates a side view of a piston ring, without any coating or plating according to an exemplary illustration.
Figure 2A:
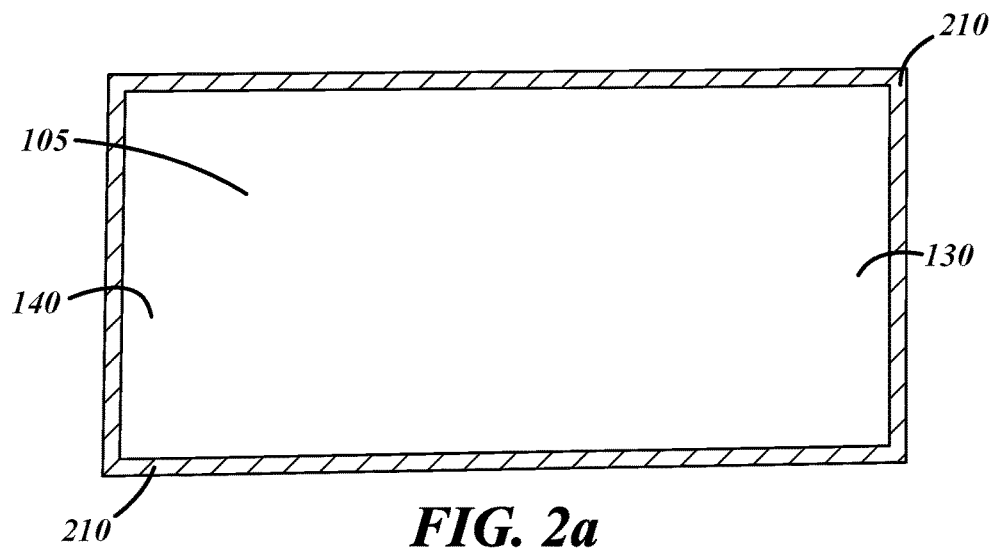
FIG. 2a illustrates a nickel plated piston ring, according to another exemplary illustration; the piston ring has a plated coating of nickel metal.
Figure 2B:
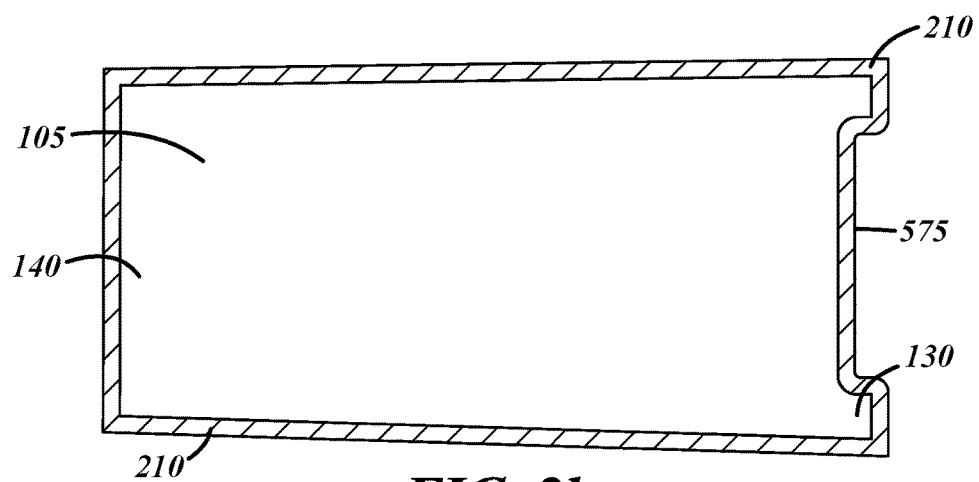
FIG. 2b illustrates a nickel plated piston ring, according to another exemplary illustration; the piston ring has a plated coating of nickel metal.

The first step of the plating process deposits a layer of nickel 210 on to the surfaces of the piston ring, 110,120,130 and 140. FIG. 1 illustrates one exemplary shape of the piston ring used in the present embodiment.

Electrolytic plating, in general, is the process used in electroplating and is analogous to a galvanic cell acting in reverse. The part to be plated is the cathode of the circuit. In this embodiment, the anode is made of the metal to be deposited on the part. Both components are immersed in a solution called an electrolyte containing one or more dissolved metal salts as well as other ions that permit the flow of electricity.

A second layer of nickel is applied onto the electrolytic deposited first layer. The second layer of nickel is applied using a best known electro-less deposition method used in the automotive industry. In general, an electro-less nickel plating solution might contain a water-soluble nickel salt, a reducing agent, and other components required to effectively and properly produce the required coating.

Electro-less plating, in general, is an auto-catalytic chemical technique used to deposit a layer of pure nickel or nickel alloy on a solid work piece, such as metal or plastic. The process may rely on the presence of a reducing agent which reacts with the metal ions in the plating bath to deposit metal.

Both plated nickel layers can be deposited over the entire surface or selected surfaces of the piston ring. The inner peripheral diameter 140, the upper lateral side, 110, the lower lateral side 120, and the outer peripheral diameter 130 can be covered with the nickel plating 210.

Both plating processes used to coat the piston ring body 105 use best known predetermined nickel plating parameters and chemistry on the ring body. Using predetermined processing parameters allows for repeatability of the plating operation. Repeatability in the plating process provides a uniform application of the nickel metal 210 illustrates the plated ring before any plating metal is removed.

Because the plated nickel acts a s a barrier to subsequent coating formation, certain areas of the nickel plating must be removed so nitride can be deposited. The nickel plating can be removed from the inner peripheral diameter of the ring 140. The nickel plating is removed essentially the entire upper 110 and lower lateral 120 sides of the piston ring. The plating layer can be removed with any mechanical, electro-chemical or chemical methods that lend themselves to the embodiment of this application.

The wear resistant nitride coating 350, is applied to selected ring surfaces after the plating metal has been removed from specific areas on the ring. The nitride process is used in the embodiment of this description may have a greater wear resistance that the base metal of the piston ring body 105.

The exemplary piston ring may be formed of a base metallic material 105, e.g., steel. Exemplary piston rings may be employed in an outer circumferential groove of a piston (not shown). The piston may be received within an engine block (not shown) defining an inner bore surface or cylinder liner surface.

The piston ring has a outer peripheral diameter surface 130, this outer peripheral diameter surface may include an exemplary HVOF coating 360. This outer peripheral diameter surface also has the base metal of the piston ring exposed 460, 470, 480 and 490. All surfaces may contact the cylinder liner wall (not shown).

Figure 4:
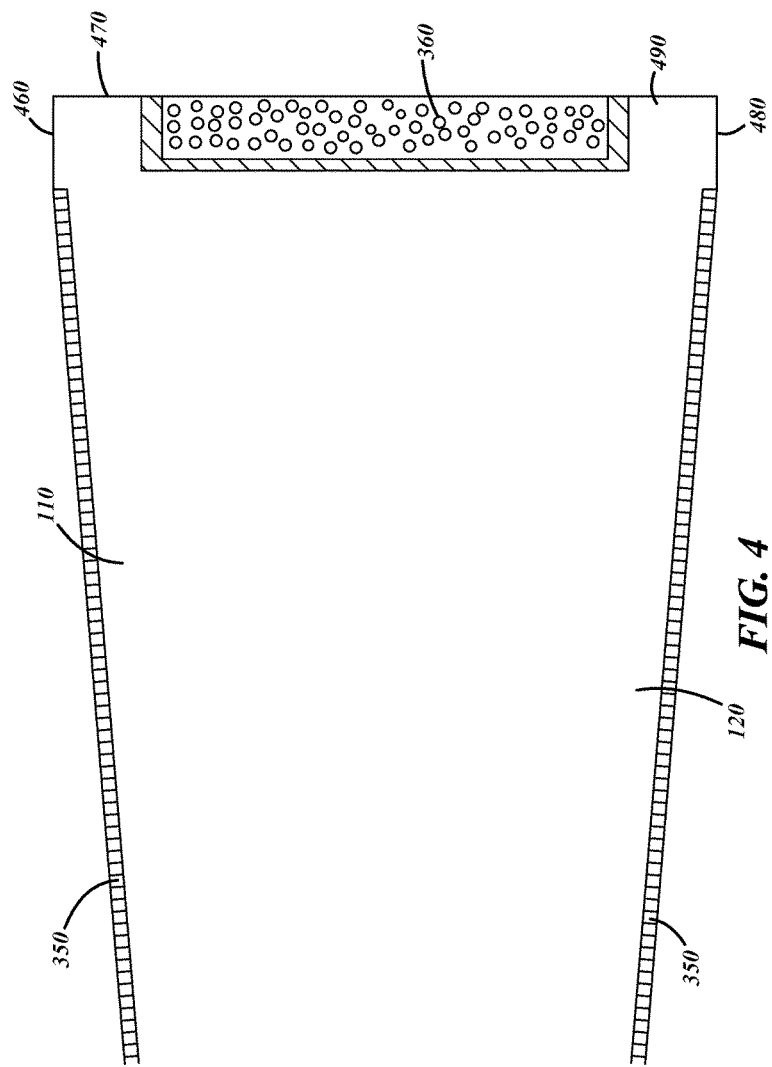
FIG. 4 illustrates a piston ring with plating removed from selected areas according to another exemplary illustration.

As best seen in FIG. 4, the piston ring essentially presents three surfaces to the piston ring groove (not shown) and cylinder liner surface (not shown). A nitride coating 350, a HVOF coating 360, and uncoated piston ring metal surfaces 460, 470, 480, and 490 all may be present on the piston ring simultaneously.

Piston rings can be manufactured from solid wire composed of the piston ring base material. In some embodiments of this disclosure the wire is extruded or bent. These operations can ultimately form the recess 575, present on the outer peripheral diameter surface 130, of the piston ring. In other embodiments of this disclosure, the wire is subjected to a localized grinding process that forms the recess 575, present on the outer peripheral diameter 130 of the piston ring.

Figure 3:
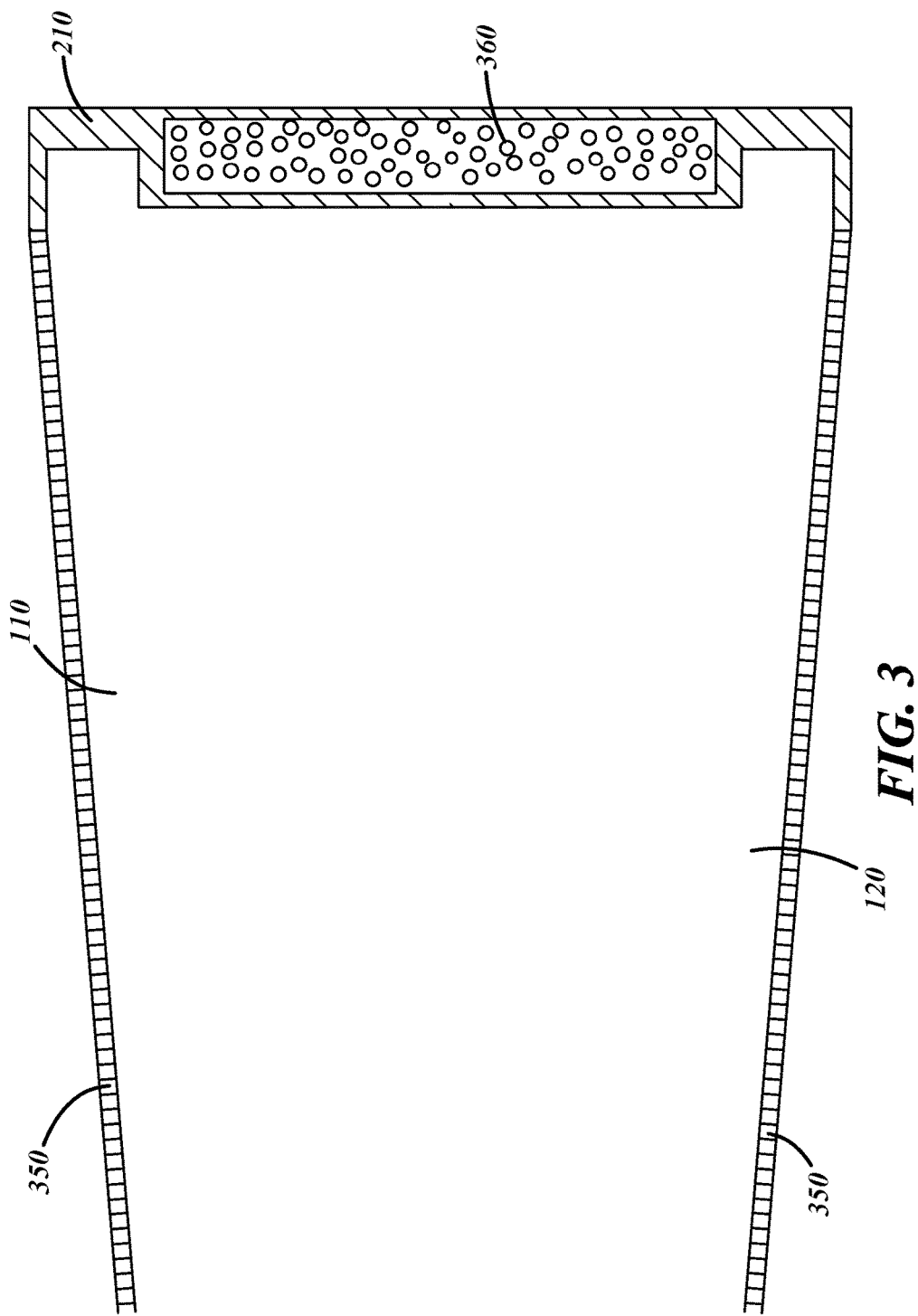
FIG. 3 illustrates a piston ring with the nickel plating removed and a nitride coating on the upper and lower lateral sides of the piston ring, according to another exemplary illustration.
Figure 5:
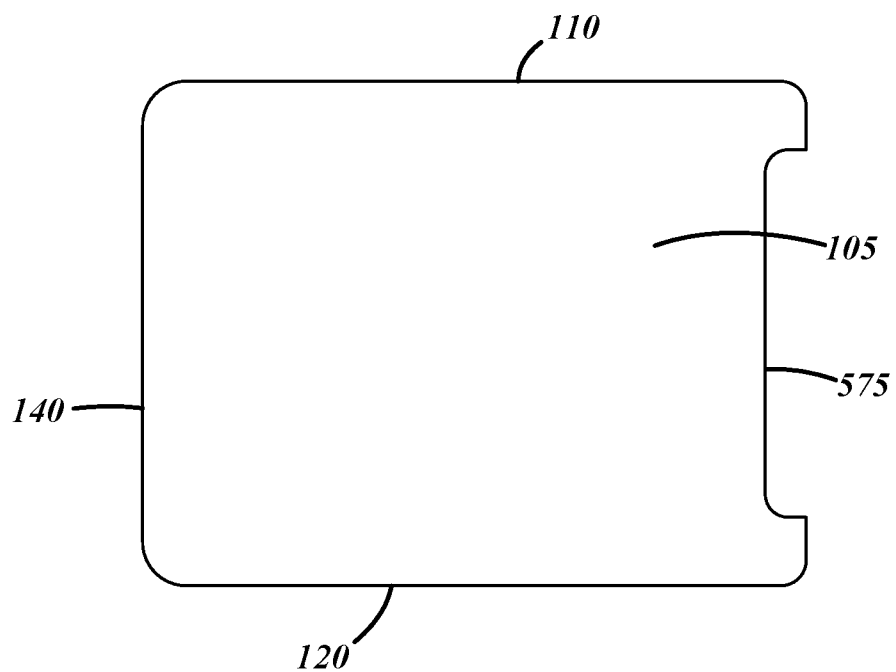
FIG. 5 illustrates a piston ring with a recessed area present on the outer surface of the piston ring according to another exemplary illustration.

FIG. 5 illustrates one exemplary shape of the piston ring used in the present embodiment. The recess 575, present in the outer peripheral diameter surface may be formed by a grinding operation. FIG. 3 illustrates one exemplary plating configuration used to mask surfaces of a piston ring. As depicted in FIG. 4, surfaces 460, 470, 480, and 490 of the piston ring are not coated with the wear resistant nitride surface. The nickel plating 210 depicted in FIG. 3, prevents the formation of a nitride on these surfaces.

A HVOF thermal spray coating 360 may be applied to specific areas on the surface of the piston ring. The following thermal spray application methods are listed as examples and do not define every method that may be utilized to form the HVOF coating within the recess 575. HVOF, arc spray, and/or flame spray can be used to apply the HVOF coating 360.

The material selected to form a desired thermal spray coating 360 may be introduced into the spray device such that the material melt or partially melt. When the HVOF material contacts the piston ring outer radial surface 130, inside the recess 575, of the piston ring, the HVOF coating is formed. The HVOF coating process is used to fill the recess 575 that may be present on the outer radial surface of the piston ring.

HVOF spray parameters used to deposit an exemplary layer of coating on the piston ring surface and within the recess located on the outer radial surface of the piston ring: sprayer: High-speed frame thermal sprayer JP-5000 (manufactured by Praxair/TAFA), gas flow rate, e.g. oxygen: gas flow volume 1900 scfh (893 l/min), flow rate of fuel, e.g. kerosene: 5.1 gph (0.32 l/min) Thermal spray distance, barrel end to target surface e.g.: 380 mm, barrel length: 4 inches (approximately 100 mm), powder supply rate: Approximately 80 g/min.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

We claim:

1. A method of forming a piston ring comprising:
providing a piston ring body formed of a base metallic material and having an upper lateral side, a lower lateral side, an outer peripheral side, an inner peripheral side, and first and second corners where the upper and lower lateral sides terminate into the outer peripheral side;
applying a masking agent to an entire exterior surface of the piston ring body;
removing a portion of the masking agent from a first selective area on the exterior surface of the piston ring body along the upper lateral side and the lower lateral side of the piston ring body to expose the base metallic material;
applying a nitride layer to the first selective area on the exterior surface of the piston ring body, wherein the remaining portion of the masking agent on the exterior surface of the piston ring body inhibits application of the nitride layer to areas on the exterior surface of the piston ring body other than the first selective area;
removing the masking agent from a second selective area along the outer peripheral side and along the first and second corners of the piston ring body to expose the base metallic material;
forming a recess in the outer peripheral side of the piston ring body; and
forming a thermal spray coating within the recess in the outer peripheral side of the piston ring body.

2. The method of claim 1 wherein the piston ring body is formed of stainless steel.

3. The method of claim 1 wherein the masking agent is applied to the entire exterior surface of the piston ring body by a two-step electro-chemical deposition process.

4. The method of claim 1 wherein the masking agent is applied to the entire exterior surface of the piston ring body by (i) depositing a first layer of nickel plating on the entire exterior surface of the piston ring body using an electrolytic deposition process, and then (ii) depositing a second layer of nickel plating over the first layer of nickel plating on the entire exterior surface of the piston ring body using an electro-less deposition process.

5. The method of claim 4 wherein the first layer of nickel plating is deposited on the entire exterior surface of the piston ring body at a first thickness and the second layer of nickel plating is deposited on the entire exterior surface of the piston ring body at a second thickness greater than the first thickness.

6. The method of claim 1 wherein the nitride layer is applied to the first selective area on the exterior surface of the piston ring body using a nitride diffusion process.

7. The method of claim 1 wherein the first corner of the piston ring body comprises an outer peripheral end portion of the upper lateral side and an upper end portion of the outer peripheral side, and the second corner of the piston ring body comprises an outer peripheral end portion of the lower lateral side and a lower end portion of the outer peripheral side, and wherein the nitride coating is not applied to the first and second corners of the piston ring body such that the base metallic material of the piston ring body is exposed along the outer peripheral end portions of the upper and lower lateral sides and along the upper and lower end portions of the outer peripheral side.

8. The method of claim 7 comprising: coating the upper and lower end portions of the outer peripheral side of the piston ring body with a chromium plating, a chromium-ceramic coating, or a HVOF coating.

* * * * *